United States Patent [19]

Powell

[11] Patent Number: 5,183,129
[45] Date of Patent: Feb. 2, 1993

[54] COLLAPSIBLE SCOOTER

[76] Inventor: Robert M. Powell, Rte. 1, Box 1025, Quinlan, Tex. 75474

[21] Appl. No.: 716,085

[22] Filed: Jun. 17, 1991

[51] Int. Cl.⁵ .............................................. B62D 61/00
[52] U.S. Cl. ...................... 180/208; 180/219; 280/278; 280/287; 464/117
[58] Field of Search ............... 280/278, 287; 180/208, 180/219, 223, 231, 210, 907; 403/373; 464/117

[56] References Cited

U.S. PATENT DOCUMENTS

| D. 317,954 | 7/1991 | Cohen . | |
|---|---|---|---|
| 2,493,287 | 1/1950 | Hatfield . | |
| 3,354,975 | 11/1967 | Stuart | 180/223 |
| 3,388,761 | 6/1968 | Arpin | 180/208 |
| 3,417,834 | 12/1968 | Smith . | |
| 4,460,191 | 7/1984 | Ishibashi et al. . | |
| 4,611,818 | 9/1986 | Cammarata . | |
| 4,821,832 | 4/1989 | Patmont . | |
| 4,842,091 | 6/1989 | Badsey . | |
| 4,955,628 | 9/1990 | Chiu | 180/210 |
| 4,995,626 | 2/1991 | Mantague | 280/278 |
| 5,006,007 | 4/1991 | Fischer et al. | 403/373 |

FOREIGN PATENT DOCUMENTS

| 0362033 | 4/1990 | European Pat. Off. | 180/208 |
|---|---|---|---|
| 1007800 | 5/1952 | France | 280/287 |

Primary Examiner—Margaret A. Focarino
Assistant Examiner—Paul Dickson
Attorney, Agent, or Firm—Haynes and Boone

[57] ABSTRACT

An improved, highly portable, collapsible scooter having a front frame extending upwardly from a front portion of a lower frame and being pivotally secured thereto. The front frame is secured at its upper end to steering means, and a front wheel is rotatably secured to the steering means. A rear wheel is rotatably secured to a rear portion of the lower frame, and a platform for supporting a rider is secured to the lower frame between the front and rear wheels. Lock means releasably lock the front frame and lower frame in an operating position or in a collapsed position in which the front frame extends rearwardly from the front portion of the lower frame. An engine is preferably coupled with the rear wheel of the scooter using a belt drive system which preferably includes toothed pulleys and a notched drive belt.

21 Claims, 5 Drawing Sheets

COLLAPSIBLE SCOOTER

BACKGROUND OF THE INVENTION

This invention relates to a collapsible vehicle and, more particularly, to a collapsible scooter which is a fuel efficient, highly portable means of transportation.

A variety of collapsible scooters, both with and without motors, are known in the art. Although these collapsible scooters have proven useful and popular for transportation and recreation, they suffer from certain limitations which this invention is designed to overcome. For example, known scooters often employ complex mechanisms for collapsing the scooter to reduce its overall dimensions. These mechanisms add to the weight and expense of the scooter and often require tools or inconvenient procedures for collapsing the scooter. Further, in reducing the overall dimensions of the prior art scooters, the functionality of these scooters is often sacrificed.

Additionally, known motor scooters, despite their compactness and collapsibility, still tend to be too bulky and heavy to allow for easy lifting and transporting. Further, the motors of these scooters are typically coupled with the driven wheel utilizing techniques that are inefficient, and these motors are typically secured to the scooter in a manner which renders the engine difficult to remove or replace.

SUMMARY OF THE INVENTION

It is therefore an object of the present invention to provide a scooter which is easily collapsible without the use of complex mechanisms which add to the weight and expense of the scooter.

It is a still further object of the present invention to provide a collapsible scooter which is easily collapsible without the use of tools or inconvenient procedures.

It is a still further object of the present invention to provide a collapsible scooter of extremely light weight for easy lifting and transporting.

It is a still further object of the present invention to provide a collapsible scooter which does not unduly sacrifice functionality to achieve compactness and portability.

It is a still further object of the present invention to provide a collapsible scooter which utilizes highly efficient means of coupling an engine to the driven wheel.

It is a further object of the present invention to provide a collapsible scooter which provides a fuel efficient, highly portable means of transportation.

It is a still further object of the present invention to provide a collapsible scooter which allows for easy removal or replacement of its engine.

Toward the fulfillment of these and other objects, the scooter of the present invention includes a front frame member extending upwardly from a lower frame member and being pivotally secured thereto. The front frame is secured at its upper end to steering means, and a front wheel is rotatably secured to the steering means. A rear wheel is rotatably secured to a rear portion of the lower frame, and a platform for supporting a rider is secured to the lower frame between the front and rear wheels. Lock means releasably lock the front frame and lower frame in a first operating position in which the front frame extends upwardly and forwardly from the lower frame or in a second collapsed position in which the front frame extends rearwardly from the front portion of the lower frame and the front frame and steering means extend over the platform.

An engine is preferably coupled with the rear wheel of the scooter to power the scooter. The engine is secured to a spindle housing which is in turn secured to a rear portion of the lower frame. The engine's rotational energy is transferred to a spindle shaft which is rotatably secured to the spindle shaft housing. A front pulley is secured to the spindle shaft, and a drum pulley is secured to the rear wheel, both pulleys being toothed pulleys. A notched drive belt stretches between the front and drum pulleys for transferring the rotational energy of the engine to the rear wheel.

BRIEF DESCRIPTION OF THE DRAWINGS

The above brief description as well as further objects, features, and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
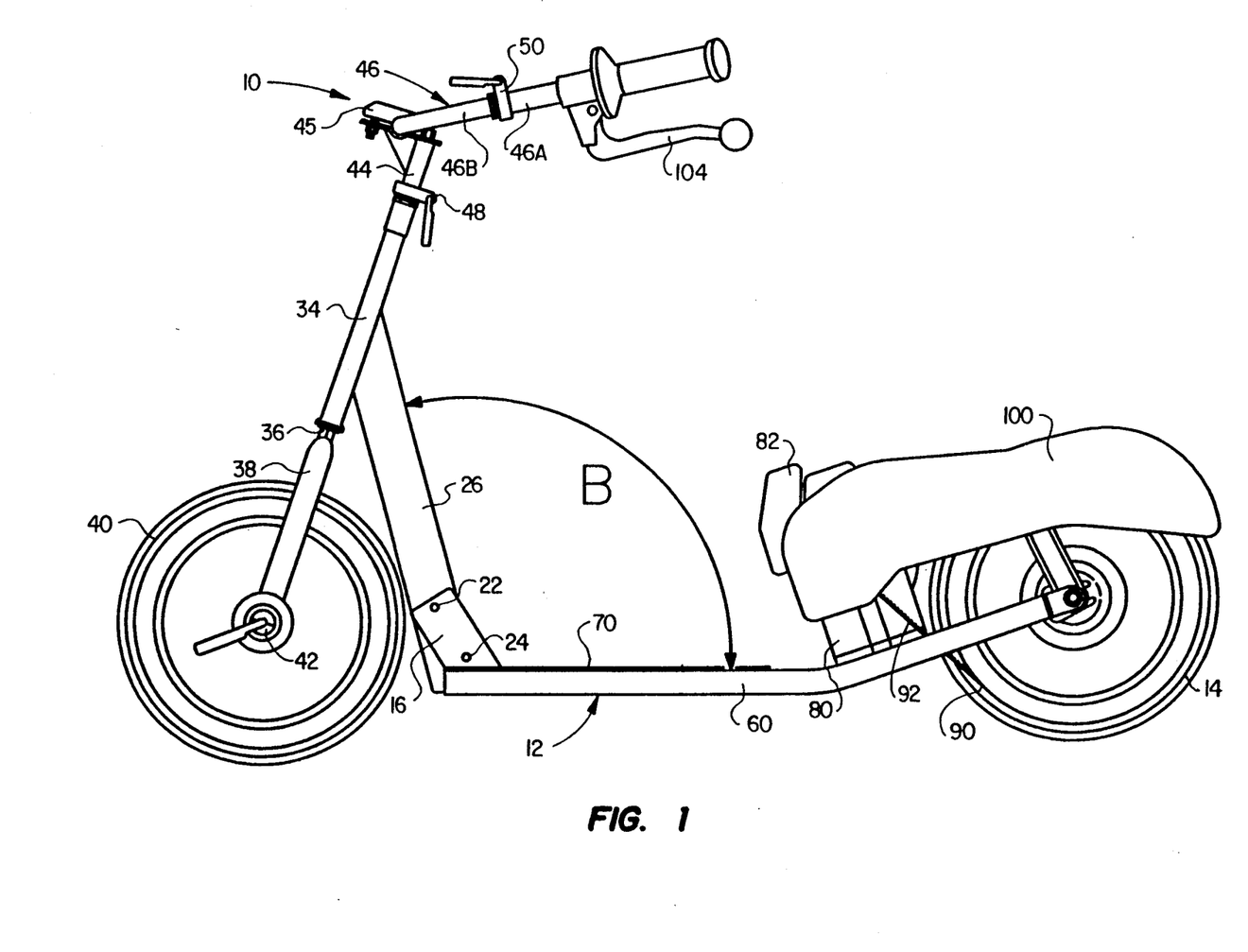
FIG. 1 is a side elevational view showing the collapsible scooter in an operating position and showing an optional rear fender.
Figure 2:
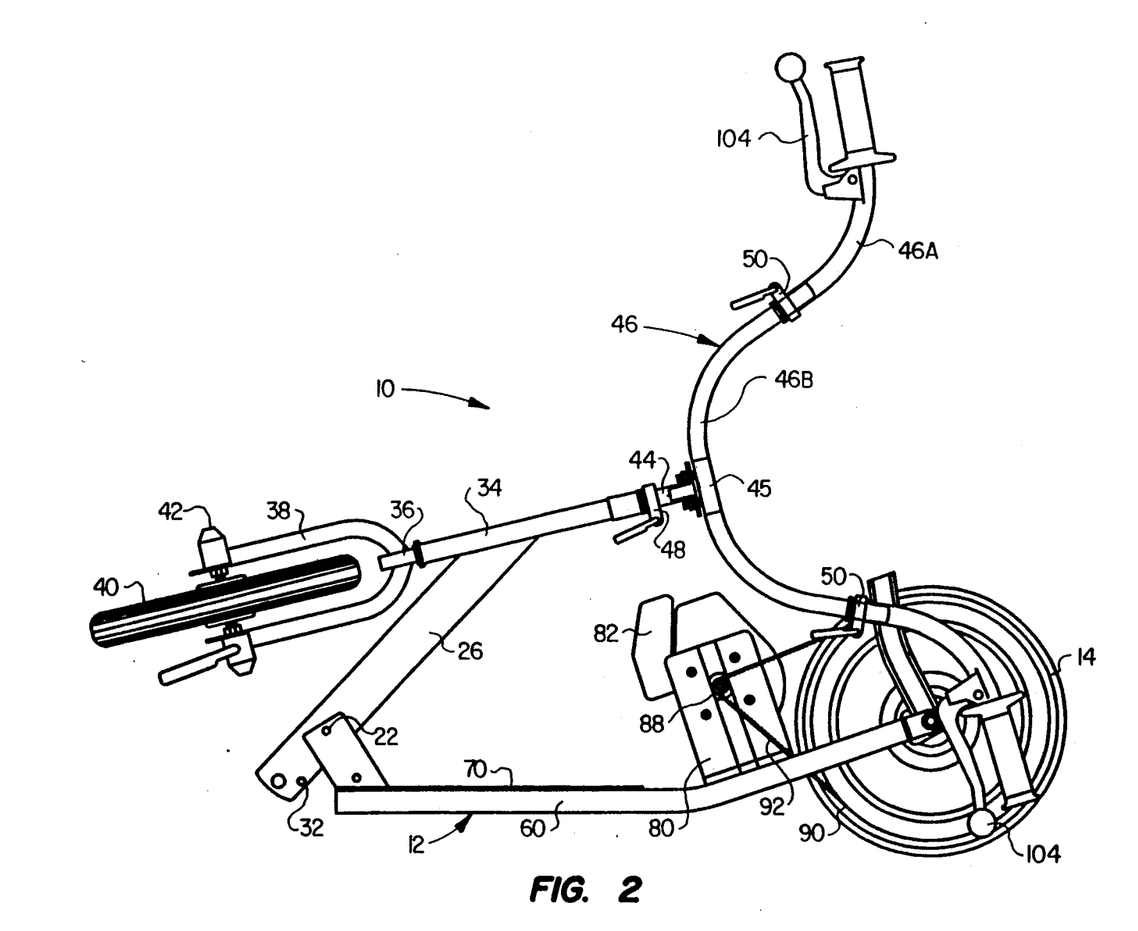
FIG. 2 is a side elevational view showing the scooter of FIG. 1 in a collapsed position without the rear fender.
Figure 3:
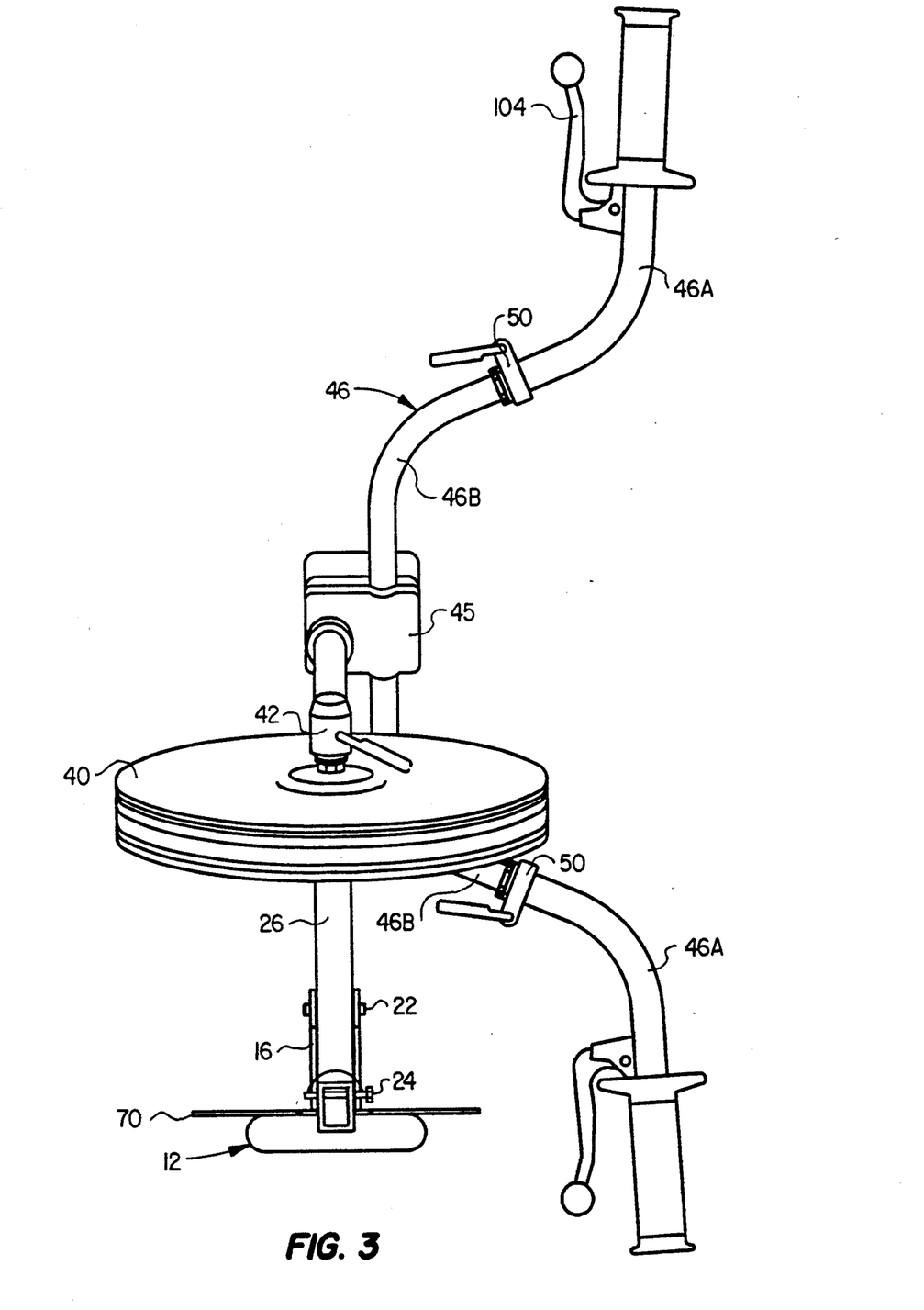
FIG. 3 is a partial front view showing the scooter in the collapsed position of FIG. 2.

Referring to FIGS. 1-3 of the drawings, the reference numeral 10 refers in general to the scooter of the present invention which includes a lower frame 12 having a rear wheel 14 rotatably secured to its rear portion.

A pair of opposing braces, or tongues, 16 are secured in any conventional manner, such as by welding, to a front, or forward, portion of the lower frame 12. A front frame 26 extends upwardly from the front portion of the lower frame 12 and is secured between the braces 16 by an an upper pivot pin 22 and a lower locking pin 24 extending through aligned openings in the lower frame 12 and the front frame 26. In the assembled position of FIG. 1, the front frame 26 preferably extends forwardly from the lower frame 12 at an angle B of greater than 90° and more preferably at an angle of approximately 122°. The front frame 26 is preferably an elongated member having a rectangular cross-section, and the specific shape of the lower frame 12 will be described in detail later.

As better shown in the collapsed position of FIG. 3, the opposing braces 16 preferably have flat, inner surfaces which are separated by a distance approximately equal to the width of the front frame 26, so that the front frame 26 will fit closely between the inner surfaces of the opposing braces 16 and will still pivot readily about the upper pivot pin 22 for collapsing. In the preferred embodiment, the front frame 26 also has a locking hole 32 (FIG. 2) extending through its lower end portion, as discussed later.

Referring again to FIG. 1, the upper portion of the front frame 26 is secured in any conventional manner, such as by welding, to a head tube 34 in which is journaled a steering column 36. The upper end of the head tube 34 preferably extends upwardly and rearwardly from the front frame 26 and preferably forms an angle with the front frame of approximately 133°.

The lower end of the steering column 36 is secured in any conventional manner, such as by welding, to a yoke 38, and a front wheel 40 is rotatably secured between the two parallel members of a yoke 38 as shown in the collapsed position of FIG. 2. The front wheel 40 is preferably rotatably secured to the yoke 38 using a quick release axle 42 so that the front wheel 40 may be quickly removed and replaced without the need for tools. The rear and front wheels 14 and 40 each are formed in a conventional manner and preferably include pneumatic tires having diameters of approximately 12 inches.

The upper end of the steering column 36 is secured to the lower end of a handlebar stem 44 which extends through the head tube 34. A mounting bracket 45 is connected to the upper end of the handlebar stem 44 and receives a handlebar 46. The handlebar stem 44 is telescoped so that the handlebar 46 may be raised or lowered to accommodate riders of different heights. A quick release, compression collar 48 is preferably used to allow easy adjustment of the handlebar stem 44 without the need for tools.

As better shown in FIGS. 2 and 3, the handlebar 46 includes two end portions 46A which are pivotally secured, by quick release compression collars 50, to a center portion 46B. In the operating position of FIG. 1, the compression collars 50 secure the end portions 46A so that they curve outwardly from the point where the center portion 46B of the handlebar is secured to the steering column 36. Although the handlebar is shown in its extended position in FIGS. 1-3, it is understood that, to further reduce the dimensions of the scooter when collapsed, the quick release, compression collars 50 may be loosened, and the end portions 46A of the handlebar 46 may be pivoted inwardly so that the end portions 46A curve inwardly toward the point where the center portion 46B of the handlebar 46 is secured to the steering column 36. If desired, the compression collar 50 may then be used to secure the end portions 46A of the handlebar in the collapsed position. While the above handlebar configuration is preferred, it is understood that any number of known handlebar configurations may be used in connection with the present scooter.

Figure 4:
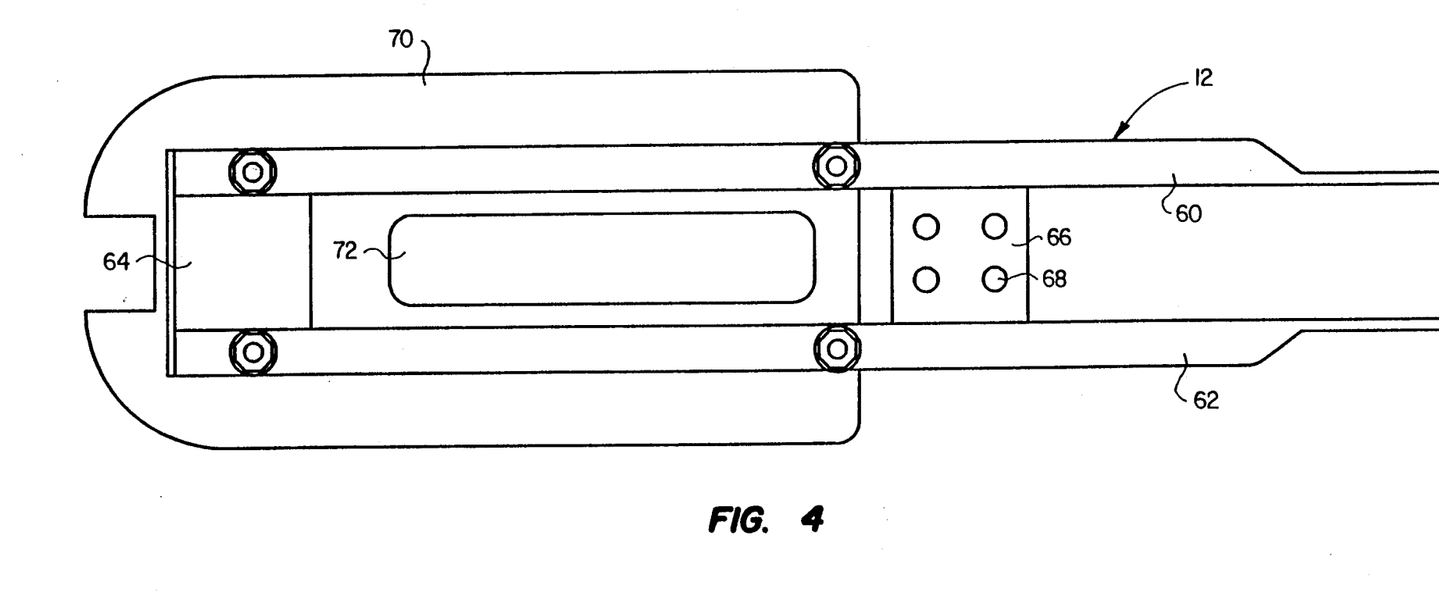
FIG. 4 is a partial, bottom view showing the lower frame and slotted platform of the scooter of FIG. 1.

The lower frame 12 may also take any number of conventional shapes, however in a preferred embodiment, as shown in FIG. 4, the lower frame 12 is formed by two elongated members 60 and 62 secured in a spaced, parallel relationship for at least a portion of their lengths by transverse members 64 and 66, which are connected between the members 60 and 62 in any conventional manner. The rear portions of the elongated members 60 and 62 are preferably angled upwardly as indicated in FIGS. 1 and 2 for rotatably receiving the rear wheel 14. The elongated members 60 and 62 preferably have circular cross sections but may have any number of cross sectional configurations. A plurality of holes 68 are formed through the transverse member 66 for mounting an engine and accompanying means for coupling the engine with the rear wheel, as will be described. It is understood that any number of elongated or transverse members may be used. It is further understood that the transverse member 66 need not have holes 68 extending therethrough, rather the engine and coupling means may be secured to the lower frame 12 in any conventional manner.

A platform, or deck, 70 for supporting a rider is secured to the lower frame 12 between the rear and front wheels 14 and 40. A slot 72 (FIG. 4) is formed through the platform 70 for receiving the front wheel 40 when it is removed from the yoke 38. The slot 72 should have a width slightly greater than the width of the front wheel 40 and a length less than the diameter of the front wheel. It is understood that the slot 72 is optional and that the platform 70 may be formed in any conventional manner.

Apparatus for driving the rear wheel 14 is shown in FIG. 1 and includes a housing 80 secured to a rear portion of the lower frame 12 in front of the rear wheel 14. An engine 82 is secured to an outer surface of the housing 80. The engine 82 is preferably a gasoline, internal combustion engine, having a 2 cycle or 4 cycle operation, and more preferably a 2 cycle engine because of its light weight. Although not shown in the drawings, it is understood that the housing 80 rotatably supports a spindle shaft (93) which is coupled at its outer end with a clutch drum (not shown). The clutch drum is engaged by a centrifugal clutch (not shown) connected to the drive shaft of the engine 82 so that the rotational energy of the engine 82 is transferred to the spindle shaft. Since these components are conventional, they are not shown in the drawings nor described in any further detail.

Referring to FIG. 2, a front pulley 88 is secured to the inner end of the above-mentioned spindle shaft. A drum pulley 90 is secured to the rear wheel 14, and a flexible, drive belt 92 is stretched between the front and drum pulleys 88 and 90 to transfer rotational energy from the engine 82 to the rear wheel 14. The front pulley 88 is preferably small in comparison to the drum pulley 90 so that the engine 82 may operate at high RPMs without powering the rear wheel at excessive speed. More particularly, the front pulley 88 preferably has a diameter of approximately 0.6 inch and the drum pulley a diameter of approximately 9 inches. The pulleys 88 and 90 are also preferably toothed, and the drive belt 92 is preferably notched or cogged to reduce slippage between the drive belt and pulleys, so that the belt drive system efficiently transfers the rotational energy of the engine to the rear wheel in all weather conditions.

Figures 5A, 5B:
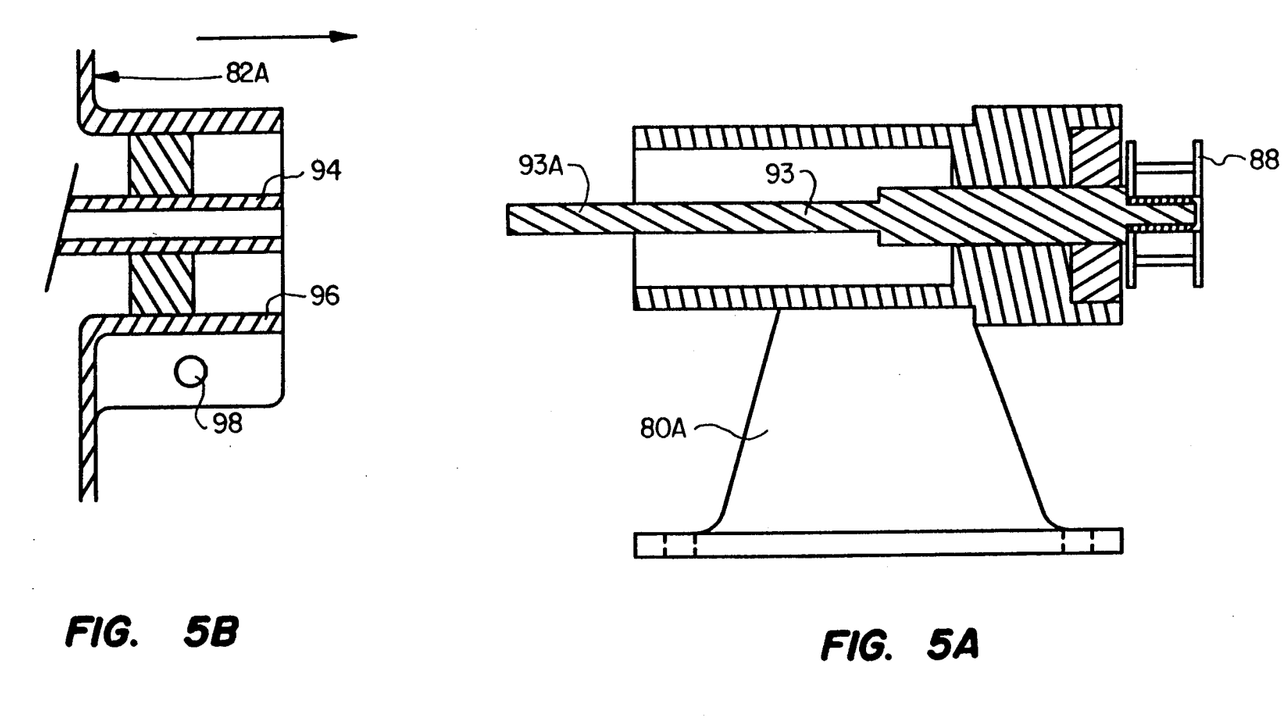
FIG. 5A is a partial, cross-sectional view showing an alternate coupling device for transferring torque from an engine to the rear wheel of the scooter, showing the engine uncoupled from the spindle shaft and spindle shaft housing for purposes of clarity.
FIG. 5B is a partial, cross-sectional schematic view showing an engine uncoupled from the spindle shaft and spindle shaft housing for purposes of clarity.

An alternate embodiment of a device for coupling the drive shaft of the engine 82 to the rear wheel 14 is shown in FIG. 5 and allows engines which are readily available commercially to be used with the scooter and further allows engines to be easily installed, removed, or replaced by tightening or loosening one bolt. In the embodiment of FIG. 5, the coupling device includes a housing 80A mounted on the transverse member 66 and having an upper cylindrical portion for receiving a spindle shaft 93. The outer end 93A of the spindle shaft 93 is formed to mate with a clutch drum shaft 94 of an engine 82A, which is mounted on the housing 80A in the manner described below. It is understood that the drive shaft, the clutch drum and centrifugal clutch described above are located within the engine 82A. The upper, outer portion of the housing 80A is formed to be received by a tubular drive shaft coupler 96 of the engine 82A. In the assembled condition (not shown), the engine 82A is moved towards the housing 80A in the direction shown by the arrow in FIG. 5 until the outer end 93A of the spindle shaft 93 extends within the drive shaft 94 and the tubular drive shaft coupler 96 is clamped about the cylindrical upper outer end of the housing 80A by a bolt 98, thereby securing the engine 82A to the housing 80A. The engine 82A may be easily removed by loosening the bolt 98 and sliding the tubular drive shaft coupler 96 from the upper, outer portion of the housing 80A to the inoperative, disassembled position of FIG. 5.

As shown in FIG. 1, a rear fender 100 may be secured to the frame 12 so that it at least partially covers the belt drive mechanism and rear wheel 14 for noise reduction and safety. An exhaust outlet (not shown) may direct engine exhaust to the partial enclosure created by the rear fender 100 for additional noise reduction. An engine cover (not shown) may also be secured to the frame or engine for further noise reduction and safety, and the inner surfaces of the fender 100 and engine cover may also be foam-lined for still further noise reduction.

The scooter may be provided with brakes and a throttle control which may be controlled by levers 104 (FIG. 1) attached to the handlebar 46. The scooter may also be equipped with other amenities typically found on similar vehicles, such as a kickstand, a seat, and lights (not shown).

While the scooter is in operation, the front frame 26 is secured in operating position of FIG. 1 between the opposing braces 16 by upper pivot pin 22 and lower locking pin 24. To collapse the scooter, such as for storage or transporting, the lower locking pin 24 is removed from the holes formed through the braces 16 and the front frame 26. The front frame 26 is then pivoted rearwardly about the pivot pin 22 to the collapsed position a shown in FIGS. 2 and 3, exposing the locking hole 32 (FIG. 2) of the front frame 26, and the lower locking pin 24 is inserted through the locking hole 32. As better shown in FIG. 3, when inserted through the locking hole 32, the lower locking pin 24 prevents the front frame 26 from being pivoted forwardly about the upper pivot pin 22.

In addition to pivoting the front frame 26 about the pivot pin 22 to the collapsed position, the dimensions of the collapsed motor scooter may be further reduced by removing the front wheel 40 using the quick release axle 42 and placing the front wheel 40 in the slot 72 (FIG. 4) in the deck 70. The front frame 26 is then collapsed as described above and as shown in FIGS. 2 and 3, and the front frame 26 and head tube 34, when locked in the collapsed position, help to retain the front wheel 40 in the slot 72. Also, the handlebar 46 may be collapsed by loosening the compression collars 50 and pivoting the end portions of the handlebar inwardly as described above.

Several advantages result from the scooter of the present invention. For example, the scooter of the present invention is easily collapsible without the use of complex mechanisms which add to the weight and expense of the scooter. The scooter of the present invention is also easily collapsible without the use of tools or inconvenient procedures. Additionally, the scooter of the present invention is of extremely light weight for easy lifting and transporting, and although easily collapsible, the scooter of the present invention does not unduly sacrifice functionality to achieve compactness and portability. A preferred embodiment of the present invention provides a collapsible scooter which includes an engine and utilizes highly efficient means for coupling the engine to the driven wheel. This preferred embodiment further provides a fuel efficient, highly portable means of transportation. Still further, an alternate embodiment of the present invention further provides a collapsible scooter having an engine which is easily removed or replaced.

It is understood that variations in the foregoing can be made in the foregoing without departing from the scope of the invention. For example, it is understood that any number of dual pin locking arrangements may be used to lock the scooter in the operating and collapsed positions. For example, the front frame 26 and steering mechanism may be pivoted about either of the pins 22 and 24 to collapse the scooter. Also, the opposing braces 16 may have an additional set of corresponding, aligned holes formed therethrough for receiving the locking pin 24 to lock the front frame 26 and the lower frame 12 in the collapsed position. Additionally, a single set of corresponding aligned holes may be formed through the braces 16 and front frame 26 in a position such that the single set of holes may serve to lock the front frame 26 and lower frame 12 in both the operating and the collapsed positions. Further, the pivot pin 22 about which the front frame 26 pivots may be readily removable from the holes in the opposing braces 16 and front frame 26 or may be secured to the opposing braces or front frame so that the pin is not readily removable.

Other modifications, changes, and substitutions are intended in the foregoing disclosure, and in some instances, some features of the invention will be employed without a corresponding use of other features. Accordingly, it is appropriate that the appended claims be construed broadly and in a manner consistent with the scope of the invention.

What is claimed is:

1. A collapsible scooter comprising:
    a lower frame having front and rear portions,
    a front frame having upper and lower portions, said lower portion of said front frame being secured to said front portion of said lower frame in a manner to permit pivotal movement between said front and lower frames between an operative position in which said front frame extends at a first angle with respect to said lower frame, and a collapsed position in which said front frame extends at a second angle with respect to said lower frame, said lower portion of said front frame being pivotally secured to said front portion of said lower frame by an assembly comprising a pair of opposing braces extending upwardly from said front portion of said lower frame, said lower portion of said front frame extending between said braces, and a pivot pin secured between said braces, said lower portion of said front frame having a hole through which said pivot pin passes so that said front frame may pivot about said pivot pin between said operative position and said collapsed position,
    steering means secured to said upper portion of said front frame,
    a front wheel secured to said steering means in a manner to permit angular rotation of said wheel relative to said front frame,
    a rear wheel secured to said rear portion of said lower frame, and a locking pin for releasably locking said front frame relative to said lower frame in said operative position or in said collapsed position, said braces having corresponding, aligned holes formed therethrough through which said locking pin may be secured, and said lower portion of said front frame having first and second holes formed therethrough for receiving said locking pin so that said locking pin may be inserted through said holes in said braces and through said first hole in said lower portion of said front frame to lock said front frame in said operative position or so that said locking pin may be inserted through said second hole in said lower portion of said front frame when said front frame is in said collapsed position to lock said front frame in said collapsed position.

2. The collapsible scooter of claim 1 wherein, in said operative position, said front frame extends upwardly and forwardly from said lower frame.

3. The collapsible scooter of claim 1 wherein said lower portion of said front frame has a rectangular cross-section which extends between said braces.

4. The collapsible scooter of claim 1 wherein said steering means comprises:
 a head tube secured to said upper portion of said front frame,
 a steering column having upper and lower portions and being supported by said head tube to permit rotation of said steering column relative to said head tube,
 a yoke secured to said lower portion of said steering column for rotatably receiving said front wheel,
 a handlebar stem having upper and lower portions and being secured to said upper portion of said steering column, and
 a handlebar secured to said upper portion of said handlebar stem.

5. The collapsible scooter of claim 4 wherein said handlebar stem is telescopically secured to said steering column so that said handlebar stem and said handlebar may be adjusted upwardly or downwardly to accommodate riders of different heights.

6. The collapsible scooter of claim 5 further comprising a quick release compression collar telescopically securing said handlebar stem to said steering column so that said handlebar stem and said handlebar may be adjusted upwardly or downwardly without the use of tools.

7. The collapsible scooter of claim 4 wherein said head tube has upper and lower ends, and wherein said upper end of said head tube extends upwardly and rearwardly from said front frame.

8. The collapsible scooter of claim 7 wherein, in said collapsed position said head tube extends generally parallel to said lower frame member.

9. The collapsible scooter of claim 1 wherein a quick release axle rotatably secures said front wheel to said steering means so that said front wheel may be removed from said steering means without the use of tools.

10. The collapsible scooter of claim 1 further comprising an engine secured to a rear portion of said lower frame, and
 means for transferring torque from said engine to said rear wheel.

11. The collapsible scooter of claim 1 further comprising:
 an engine,
 a spindle shaft housing secured to said rear portion of said lower frame and having inner and outer surfaces, said engine being secured to said outer surface of said spindle shaft housing,
 a spindle shaft rotatably secured to said spindle shaft housing and having an inner and outer end,
 means for coupling said engine to said outer end of said spindle shaft whereby torque from said engine may be transferred to said spindle shaft,
 a front pulley secured to said inner end of said spindle shaft,
 a drum pulley secured to said rear wheel, and
 a drive belt stretched between said front pulley and said drum pulley for transferring said rotational energy from said spindle shaft to said rear wheel.

12. The collapsible scooter of claim 11 wherein said front pulley and said drum pulley are toothed pulleys, and
 wherein said drive belt is notched so that said drive belt mates with said toothed pulleys to reduce slippage of said drive belt.

13. The collapsible scooter of claim 11 wherein said coupling means comprises:
 a clutch drum shaft rotatably secured to said engine, said outer end of said spindle shaft being formed to mate with said clutch drum shaft so that said clutch drum shaft ma impart said rotational energy from said engine to said spindle shaft,
 a drive shaft coupler extending from said engine for connecting said engine to said outer surface of said spindle shaft housing, and
 a bolt for tightening said drive shaft coupler about said outer surface of said spindle shaft housing so that said engine may be removed from said spindle shaft housing by loosening said bolt.

14. The collapsible scooter of claim 1 wherein said lower frame comprises:
 a plurality of elongated members having front and rear portions, and
 a plurality of transverse members secured to each of said elongated members to secure said elongated members in a spaced relationship.

15. The collapsible scooter of claim 14 wherein said rear portions of said elongated members angle upwardly for rotatably receiving said rear wheel.

16. The collapsible scooter of claim 14 wherein said elongated members extend in a spaced, parallel relationship for at least a portion of their lengths.

17. The collapsible scooter of claim 1 further comprising a platform secured to said lower frame between said front and rear wheels for supporting a rider.

18. The collapsible scooter of claim 17 wherein said platform has a slot formed therethrough for supporting said front wheel to further reduce dimensions of said scooter in said collapsed position, said slot having a width slightly greater than a width of said front wheel and said slot having a length less than a diameter of said front wheel.

19. The collapsible scooter of claim 1 further comprising an engine including drive means and means for mounting said engine relative to said lower frame.

20. The collapsible scooter of claim 19 further comprising coupling means mounted on said lower frame and operatively connected to said rear wheel, and means for quick-releaseably connecting said drive means to said coupling means for transferring the torque from said drive means to said rear wheel.

21. A collapsible scooter comprising:

a lower frame having front and rear portions, a front frame having upper and lower portions, said lower portion of said front frame being secured to said front portion of said lower frame in a manner to permit pivotal movement between said front and lower frames between an operative position in which said front frame extends at a first angle with respect to said lower frame, and a collapsed position in which said front frame extends at a second angle with respect to said lower frame, steering means secured to said upper portion of said front frame, a front wheel secured to said steering means in a manner to permit angular rotation of said wheel relative to said front frame, a rear wheel secured to said rear portion of said lower frame, means for releasably locking said front frame relative to said lower frame in said operative position or in said collapsed position, and a platform secured to said lower frame between said front and rear wheels for supporting a rider, said platform having a slot formed therethrough for supporting said front wheel to further reduce dimensions of said scooter in said collapsed position, said slot having a width slightly greater than a width of said front wheel and said slot having a length less than a diameter of said front wheel.

* * * * *

UNITED STATES PATENT AND TRADEMARK OFFICE
CERTIFICATE OF CORRECTION

PATENT NO. : 5,183,129

DATED : February 2, 1993

INVENTOR(S) : Robert M. Powell

It is certified that error appears in the above-identified patent and that said Letters Patent is hereby corrected as shown below:

Column 5, line 38, change "a" to -- as --.

Column 8, line 27, change "ma" to -- may --.

Signed and Sealed this

Second Day of November, 1993

Attest:

BRUCE LEHMAN

Attesting Officer

Commissioner of Patents and Trademarks